US012578061B2

(12) United States Patent
Michaut et al.

(10) Patent No.: US 12,578,061 B2
(45) Date of Patent: Mar. 17, 2026

(54) SEALED AND THERMALLY INSULATING TANK

(71) Applicant: GAZTRANSPORT ET TECHNIGAZ, Saint-Remy-les-Chevreuse (FR)

(72) Inventors: Erwan Michaut, Saint-Remy-les-Chevreuse (FR); Emmanuel Hivert, Saint-Remy-les-Chevreuse (FR)

(73) Assignee: GAZTRANSPORT ET TECHNIGAZ, Saint-Remy-les-Chevreuse (FR)

( * ) Notice: Subject to any disclaimer, the term of this patent is extended or adjusted under 35 U.S.C. 154(b) by 72 days.

(21) Appl. No.: 18/703,947

(22) PCT Filed: Oct. 13, 2022

(86) PCT No.: PCT/EP2022/078557
§ 371 (c)(1),
(2) Date: Apr. 23, 2024

(87) PCT Pub. No.: WO2023/072616
PCT Pub. Date: May 4, 2023

(65) Prior Publication Data

US 2024/0418326 A1 Dec. 19, 2024

(30) Foreign Application Priority Data

Oct. 27, 2021 (FR) ....................................... 2111402

(51) Int. Cl.
*F17C 13/08* (2006.01)
*F17C 13/00* (2006.01)

(52) U.S. Cl.
CPC ...... *F17C 13/004* (2013.01); *F17C 2205/018* (2013.01); *F17C 2205/0352* (2013.01); *F17C 2223/0153* (2013.01)

(58) Field of Classification Search
CPC . B63B 27/25; B63B 27/24; F17C 2205/0352; F17C 2205/018
See application file for complete search history.

(56) References Cited

FOREIGN PATENT DOCUMENTS

| | | | |
|---|---|---|---|
| FR | 2691520 | A1 | 11/1993 |
| FR | 2877638 | A1 | 5/2006 |

(Continued)

OTHER PUBLICATIONS

International Search Report for PCT application No. PCT/EP2022/078557, mailed Feb. 1, 2023.

*Primary Examiner* — Stephen J Castellano
(74) *Attorney, Agent, or Firm* — Notaro, Michalos & Zaccaria P.C.

(57) ABSTRACT

A sealed and thermally insulating tank has a bottom wall and a ceiling wall where at least a first pipe and a second pipe pass through the ceiling wall. The tank is equipped with a support foot that passes through the bottom wall that is fastened to the load-bearing structure with a guide device that is fastened to the support foot. The guide device is configured to guide the first pipe and second pipe in translation in the vertical direction where the guide device has a first collar disposed around the entirety of the first pipe and a second collar is disposed around the entirety of the second pipe. A support plate is fastened to the support foot. A first linking arm links the first collar to the support plate. A second linking arm links the second collar to the support plate.

15 Claims, 5 Drawing Sheets

(56) References Cited

FOREIGN PATENT DOCUMENTS

| | | | |
|---|---|---|---|
| JP | H0761393 | A | 3/1995 |
| KR | 20140041065 | A | 4/2014 |
| KR | 20150013972 | A | 2/2015 |
| KR | 20190136623 | A | 12/2019 |
| KR | 20190142937 | A | 12/2019 |
| WO | 2014057221 | A2 | 4/2014 |
| WO | 2019211551 | A1 | 11/2019 |

[Fig. 1]
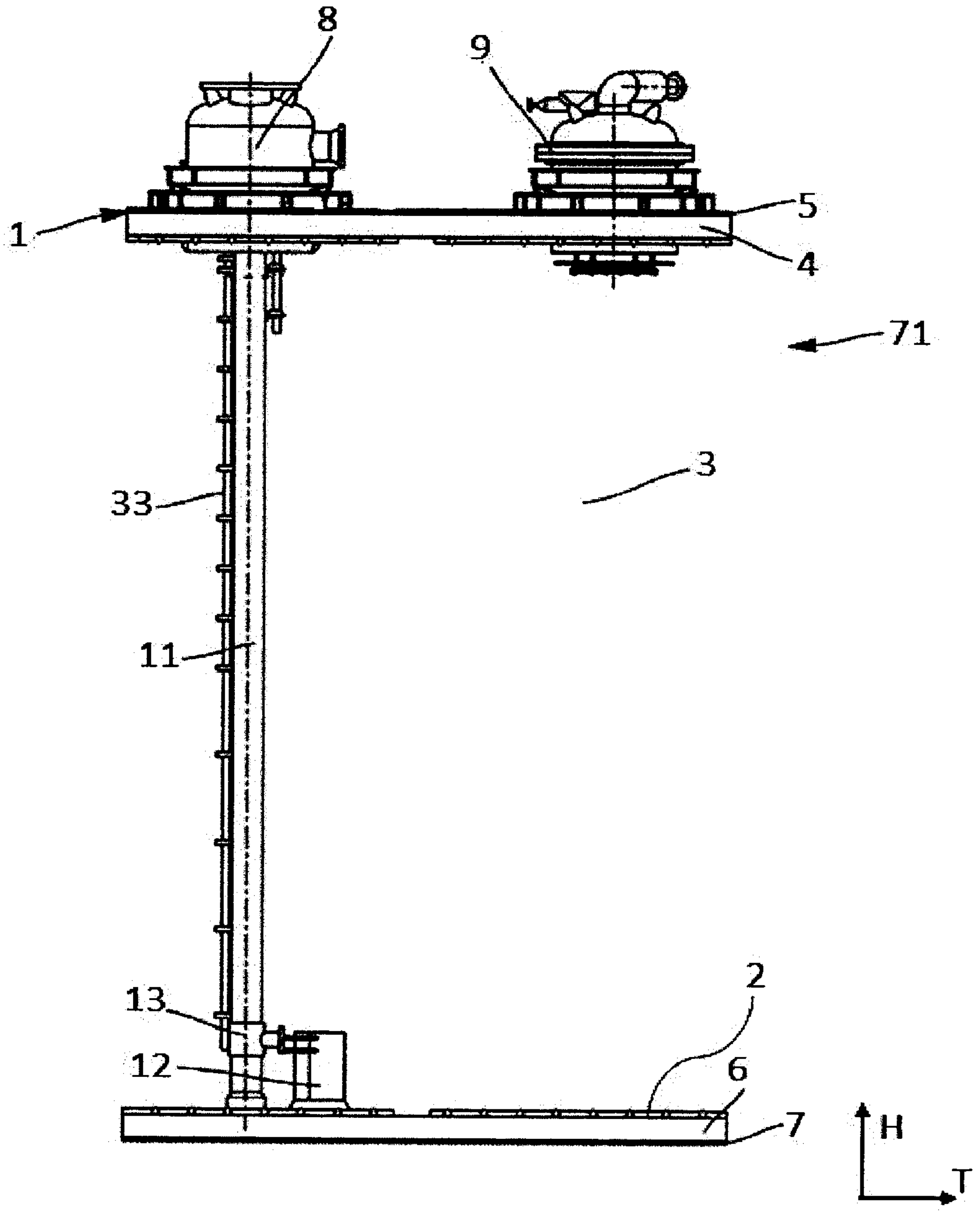

[Fig. 2]
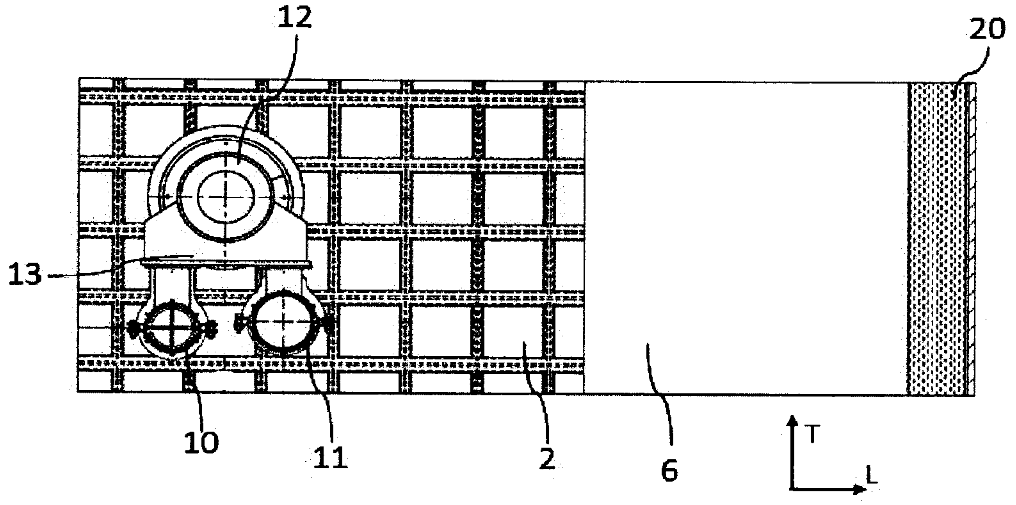
[Fig. 3]
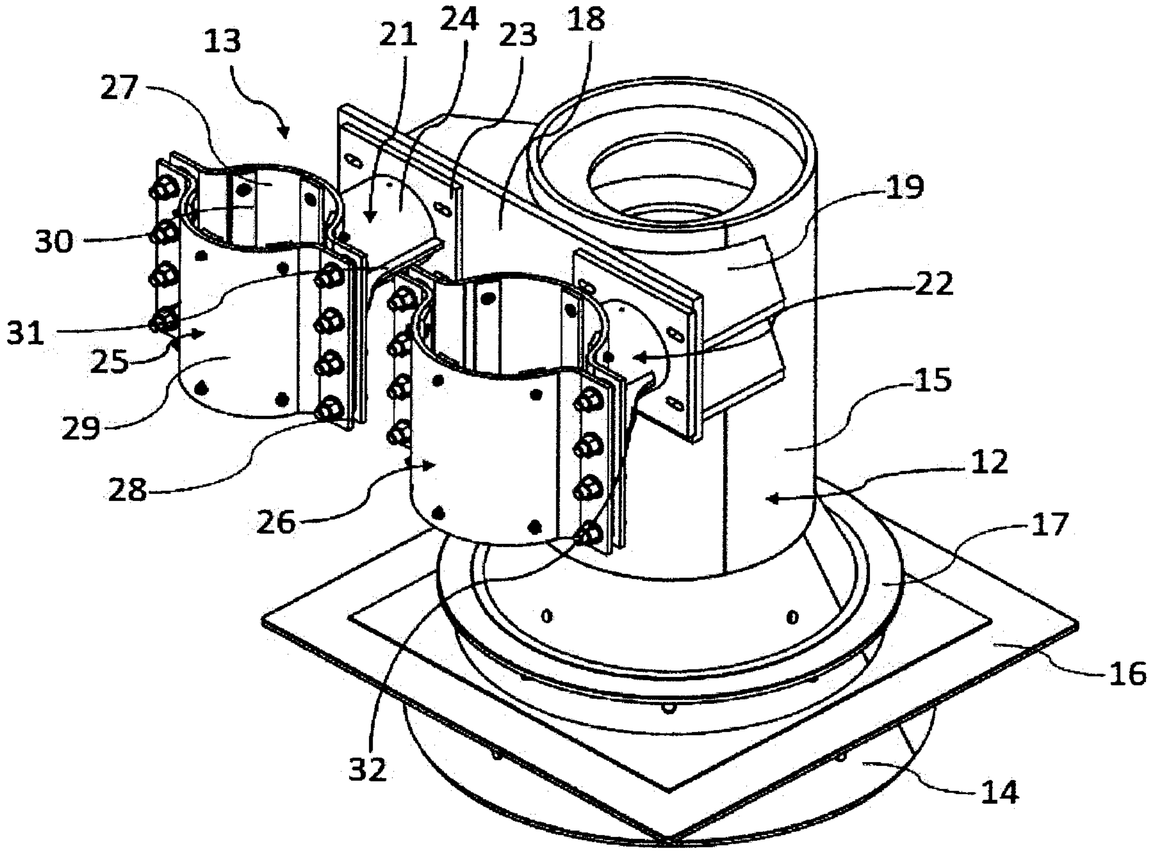

[Fig. 4]
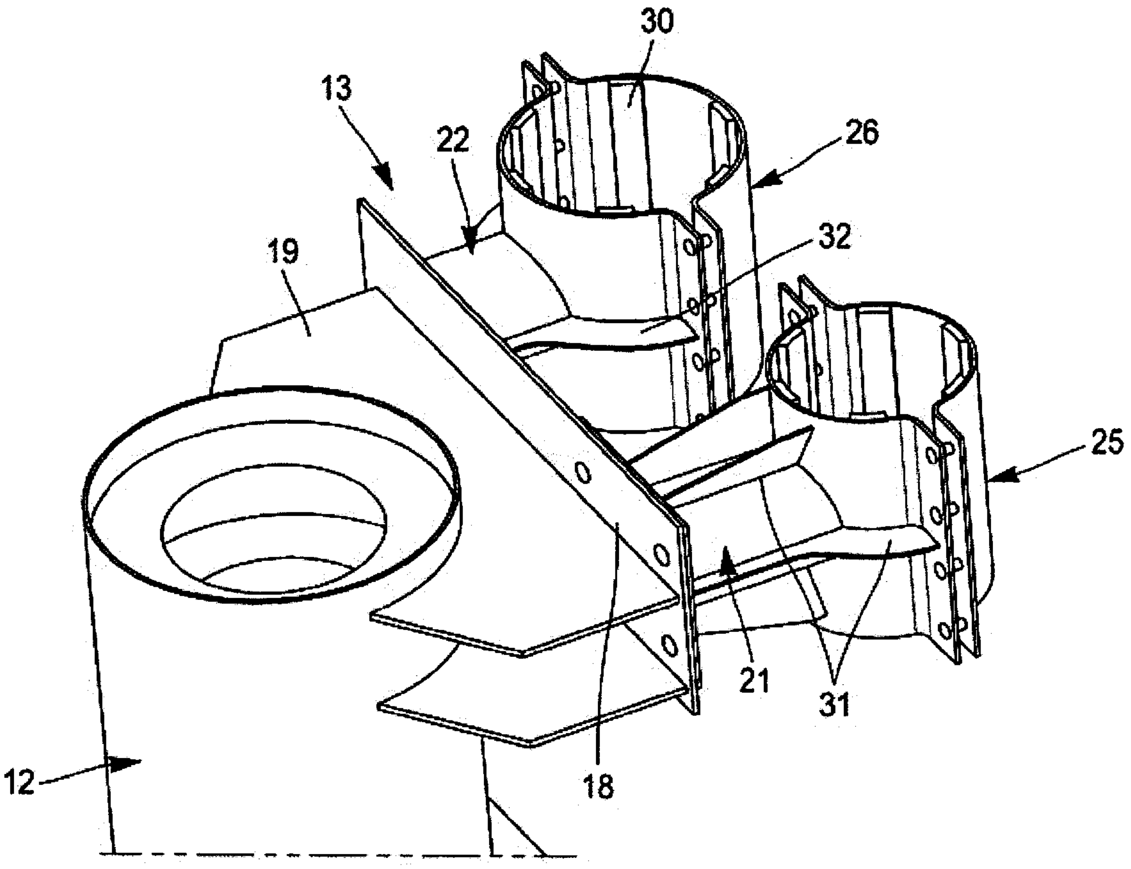

[Fig. 5]
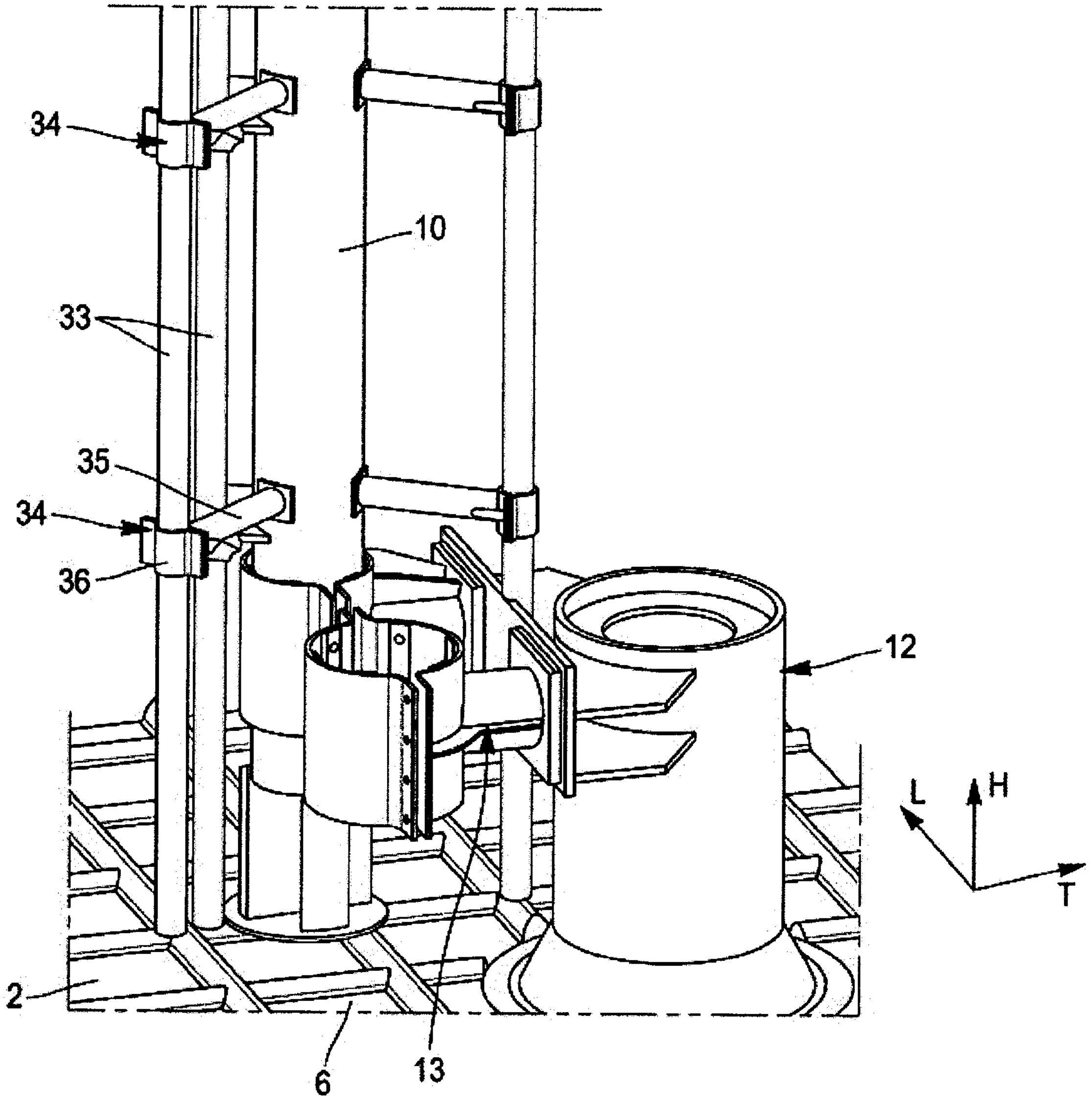

[Fig. 6]
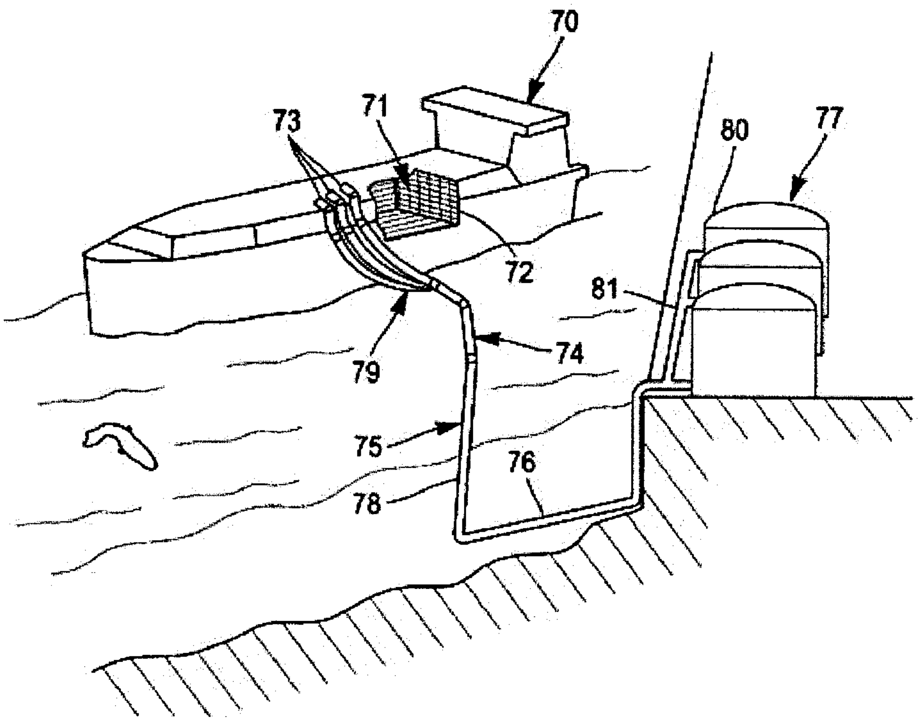

SEALED AND THERMALLY INSULATING TANK

TECHNICAL FIELD

The invention relates to the field of sealed and thermally-insulating membrane tanks. The invention relates in particular to the field of sealed and thermally-insulating tanks for the storage and/or the transportation of liquefied gas at low temperature, such as tanks for the transportation of liquefied petroleum gas (LPG) at for example a temperature between −50° C. and 0° C. inclusive or for the transportation of liquefied natural gas (LNG) at approximately −162° C. The liquefied gas may equally be for example ammonia, carbon dioxide, hydrogen, ethane or ethylene. These tanks can be installed on land or a floating structure. In the case of a floating structure the tanks may be intended to transport liquefied gas or to receive liquefied gas serving as fuel for the propulsion of the floating structure.

TECHNOLOGICAL BACKGROUND

Sealed and thermally-insulating tanks for storing liquefied natural gas (LNG) onboard a ship and equipped with a loading/offloading tower are known. The loading/off-loading tower includes a tripod structure, that is to say it includes three vertical masts that are fixed to one another by cross-members. Each of the vertical masts is hollow. Thus two of the masts form an offloading line of the tank and to this end are each associated with an offloading pump carried by the loading/offloading tower near its lower end. For its part the third mast forms a standby well enabling the lowering of a standby pump and offloading line in the event of failure of the other offloading pumps. The loading/offloading tower also carries loading lines that do not constitute one of the three masts. Such loading/offloading towers are described for example in the document WO2019211551. A tank may include one or more loading/offloading towers as required.

The loading/offloading tower is also equipped with a base that is fixed to the lower end of the three masts and supports the offloading pumps.

The loading/offloading tower further includes a guide device that is fixed against the lower face of the base and cooperates with a support foot that is fixed to the bottom wall of the supporting structure. Such a guide device aims to allow movement of the loading/offloading tower relative to the support foot in the heightwise direction of the tank in order to enable the loading/offloading tower to contract or to expand as a function of the temperatures to which it is subjected while preventing horizontal movements of the base of the loading/offloading tower.

SUMMARY

One idea behind the invention is to simplify the sealed and thermally-insulating tank and in particular the structure passing through the tank formed by the loading and offloading pipes while taking into account the phenomena of thermal contraction and expansion of the pipes.

In accordance with one embodiment the invention provides a sealed and thermally-insulating tank for storing liquefied gas integrated into a supporting structure, the tank including a bottom wall and a ceiling wall opposite the bottom wall in a heightwise direction of the tank, the bottom wall and the ceiling wall being fixed to the supporting structure, in which the ceiling wall has passed through it at least one first pipe and one second pipe, in which the tank is equipped with a support foot passing through the bottom wall and fixed to the supporting structure and a guide device fixed to the support foot, the guide device being configured to guide movement in translation in the heightwise direction of the first pipe and of the second pipe, in which the guide device includes a first collar disposed all around the first pipe, a second collar disposed all around the second pipe, a support plate fixed to the support foot, a first connecting arm connecting the first collar to the support plate, and a second connecting arm connecting the second collar to the support plate.

Thanks to these features the pipes are directly guided by the guide device which is itself fixed to the support foot without necessitating any intermediary parts as in the prior art at the base of the loading/offloading tower. Moreover, each of the pipes is individually guided by each of the collars. Thus if the pipes exhibit a different thermal contraction/expansion behavior the guide device enables guidance of the lower end of the pipes in movement in translation in the heightwise direction of the tank independently of one another. The collars also make it possible to prevent the lower end of the pipes moving.

The connecting arms and the support plate enable transfer to the support foot of forces to which the pipes are subjected having a component in the plane parallel to the bottom wall.

Embodiments of such a tank may have one or more of the following features.

In accordance with one embodiment stiffeners are formed along the first connecting arm and/or the second connecting arm.

In accordance with one embodiment the first connecting arm and/or the second connecting arm include(s) a connecting tube, preferably of circular section, having a first end and a second end, and a base connected to the first end of the connecting tube, the base being fixed, for example bolted or welded, to the support plate.

In accordance with one embodiment one end of at least one of the stiffeners is situated against the base of the first connecting arm or the second connecting arm.

In accordance with one embodiment one end of at least one of the stiffeners formed on the first connecting arm is situated against the first collar and preferably welded to the first collar.

In accordance with one embodiment one end of at least one of the stiffeners formed on the second connecting arm is situated against the second collar and preferably welded to the second collar.

In accordance with one embodiment the stiffeners include primary stiffeners and secondary stiffeners, the primary stiffeners extending from the first or second collar to the base of the first connecting arm or the second connecting arm, the secondary stiffeners having a first end situated against the first or second collar and a second end situated at a non-zero distance from the base of the first or second connecting arm.

In accordance with one embodiment the stiffeners are distributed all around the connecting tube with a regular angular pitch.

The stiffeners therefore make it possible to increase the stiffness and in particular the resistance to bending of the connecting arm.

In accordance with one embodiment the stiffeners are gussets.

In accordance with one embodiment the first collar includes a first cylindrical portion fixed to the first connecting arm and a second cylindrical portion fixed to said first cylindrical portion of the first collar.

In accordance with one embodiment the collar has a right cylinder shape with a circular, square or rectangular base, preferably a circular base.

In accordance with one embodiment the second collar has a first cylindrical portion fixed to the second connecting arm and a second cylindrical portion fixed to said first cylindrical portion of the second collar.

In accordance with one embodiment the second cylindrical portion is removably fixed to the first cylindrical portion by bolting it thereto.

In accordance with one embodiment an internal surface of the first collar and/or an internal surface of the second collar is or are equipped with at least one anti-friction pad extending for example in the heightwise direction.

In accordance with one embodiment an internal surface of the first collar and/or an internal surface of the second collar is equipped with a plurality of anti-friction pads extending for example in the heightwise direction and uniformly distributed on the internal surface.

In accordance with one embodiment the anti-friction pad is made of a material the static coefficient friction of which on steel is less than or equal to 0.2, preferably less than or equal to 0.1, for example equal to 0.04 in the case of PTFE anti-friction pads.

In accordance with one embodiment the first pipe is a liquefied gas loading pipe connected to a loading pump and the second pipe is a liquefied gas offloading pipe connected to an offloading pump.

In accordance with one embodiment the guide device is a main guide device and the ceiling wall has passed through it at least one third pipe, the tank being equipped with at least one secondary guide device, the secondary guide device being fixed to the first pipe or to the second pipe, the secondary guide device being configured to guide movement in translation in the heightwise direction of the third pipe, and the second guide device includes a third collar disposed all around the third pipe, a third connecting arm connecting the third collar to the first pipe or to the second pipe.

In accordance with one embodiment the tank includes in a direction of thickness from the exterior to the interior of the tank at least one thermally-insulating barrier and at least one sealing membrane supported by the thermally-insulating barrier and intended to be in contact with the fluid contained in the tank.

In accordance with one embodiment the tank includes successively in a direction of thickness from the exterior to the interior of the tank a secondary thermally-insulating barrier including insulating elements resting against the supporting structure, a secondary sealing membrane anchored to the insulating elements of the secondary thermally-insulating barrier, a primary thermally-insulating barrier including insulating elements resting against the secondary sealing membrane, and a primary sealing membrane anchored to the insulating elements of the primary thermally-insulating barrier and intended to be in contact with the fluid contained in the tank.

In accordance with one embodiment the invention also provides a ship for the transportation of a cold liquid product, the ship including a double hull and an aforementioned tank disposed in the double hull, the ship extending in a longitudinal direction.

In accordance with one embodiment the first connecting arm and the second connecting arm extend orthogonally to the longitudinal direction.

At sea, because of the action of the swell, the liquefied gas storage tanks are subjected to phenomena of sloshing of the cargo. These phenomena can be very violent inside the tank and consequently generate high forces in the tank and notably on the equipment thereof, such as the first pipe and the second pipe. These sloshing phenomena are greater in a transverse direction of the ship, namely a direction orthogonal to the longitudinal direction of the ship.

By disposing the connecting arms in the direction in which the sloshing phenomena are the strongest it is therefore possible for the connecting arms to function primarily in tension/compression and thus to limit the risks of damage through bending. The guide device is then able to withstand the main sloshing forces.

In accordance with one embodiment the first connecting arm and the second connecting arm extend in an arm direction at an angle between 75° and 105° inclusive to the longitudinal direction.

The arm direction is contained in a plane parallel to the bottom wall.

In accordance with one embodiment the first pipe and the second pipe are situated on either side of a transverse plane passing through the support foot that is orthogonal to the longitudinal direction, the support plate being positioned in a plane orthogonal to the transverse direction, the transverse direction being perpendicular to the longitudinal direction.

In accordance with one embodiment the support plate is fixed to the support foot by means of at least two connecting plates, the connecting plates being positioned in a plane orthogonal to the heightwise direction, the connecting plates being disposed against the support plate in the longitudinal direction so as to stiffen the support plate against bending.

In accordance with one embodiment the invention also provides a transfer system for a cold liquid product, the system including the aforementioned ship, insulated pipes arranged in such a manner as to connect the tank installed in the hull of the ship to a floating or terrestrial storage installation and a pump for driving a flow of cold liquid product through the insulated pipes from or to the floating or terrestrial storage installation to or from the tank of the ship.

In accordance with one embodiment the invention also provides a method of loading or offloading such a ship in which a cold liquid product is routed through insulating pipes from or to a floating or terrestrial storage installation to or from the tank of the ship.

BRIEF DESCRIPTION OF THE FIGURES

The invention will be better understood and other aims, details, features and advantages thereof will become more clearly apparent in the course of the following description with reference to the appended drawings of particular embodiments of the invention provided by way of non-limiting illustration only.

FIG. 1 represents a partial view in section of a sealed and thermally-insulating tank in accordance with one embodiment including in particular on the ceiling wall a dome structure and a manhole structure and on the bottom wall a support foot.

FIG. 2 is a partial view from above of a bottom wall of the sealed and thermally-insulating tank including a support foot and a guide device in accordance with one embodiment.

FIG. 3 is a perspective view of a support foot fitted with a guide device in accordance with a first embodiment.

FIG. 4 is a perspective view of a support foot fitted with a guide device in accordance with a second embodiment.

FIG. 5 is a partial perspective view of a bottom wall equipped with a support foot and the guide device in accordance with the second embodiment, the loading pipe and secondary pipes being represented.

FIG. 6 is a diagrammatic cutaway representation of a methane tanker including a sealed and thermally-insulating tank and of a terminal for loading/offloading that tank.

DESCRIPTION OF EMBODIMENTS

In the present application the terms "internal" and "external" designate positions of elements of the sealed and thermally-insulating tank 71 relative to the interior of the tank, internal elements being closer to the interior of the tank than external elements.

FIG. 1 represents a sealed and thermally-insulating tank 71 for liquefied gas that is accommodated inside and anchored to the supporting structure 1, the supporting structure 3 being for example formed by the double hull 72 of a ship 70, as represented in FIG. 6.

The tank 71 is a membrane tank for storing liquefied gas. The tank 71 has a multilayer structure including from the exterior to the interior in a direction of thickness of the wall a secondary thermally-insulating barrier including insulating elements resting against the supporting structure 1, a secondary sealing membrane resting against the secondary thermally-insulating barrier, a primary thermally-insulating barrier including insulating elements resting against the secondary sealing membrane, and a primary sealing membrane 2 intended to be in contact with the liquefied gas contained in the tank 71. The primary sealing membrane 2 defines an internal space 3 intended to receive the liquefied gas. Such membrane tanks are described in particular in the patent applications WO14057221, FR2691520 and FR2877638, for example.

The liquefied natural gas intended to be stored in the tank 1 may in particular be liquefied natural gas (LNG), that is to say a gas mixture including mostly methane and one or more other hydrocarbons. The liquefied gas may equally be ethane or liquefied petroleum gas (LPG), that is to say a mixture of hydrocarbons resulting from refining petroleum and essentially including propane and butane.

The tank 71 is a polyhedral tank including in particular a ceiling wall 4 fixed to an upper supporting wall 5 of the supporting structure 1 and a bottom wall 6 fixed to a lower supporting wall 7 of the supporting structure 1, the ceiling wall 4 and the bottom wall 6 being spaced from one another in a heightwise direction H. The tank 71 also includes a front wall and a rear wall 20, visible in FIG. 2, spaced from the front wall in a longitudinal direction L. The tank 71 equally includes lateral walls that with the bottom wall 6, the ceiling wall 4, the front wall and the rear wall 20 close off the internal space 3. The lateral walls are disposed on either side of the bottom wall 6 in a transverse direction T perpendicular to the longitudinal direction L. When the tank 71 is disposed in a ship 70 the longitudinal direction L corresponds to the longitudinal direction of the ship 70.

FIG. 1 represents a part of the tank 71 of which only a portion of the ceiling wall 4 and a portion of the corresponding bottom wall 6 have been represented.

As can be seen in FIG. 1 the tank 71 includes a dome structure 8 and a manhole structure 9, each structure 8, 9 passing through an opening made in the ceiling wall 4 and the upper supporting wall 5. As represented in FIG. 1 the manhole structure 9 is situated at a distance from the dome structure 8.

The dome structure 8 in particular enables the liquefied gas loading and offloading pipes 10, 11 to pass in sealed manner through the ceiling wall 4. The manhole structure 9 for its part is for preserving access for an operative, for example for repair operations, and leads to the internal space 3 of the tank 1.

The loading pipe 10 and the offloading pipe 11 therefore discharge into the internal space 3 of the tank 1 in order to load or offload liquefied gas to or from the latter. Moreover and as can be seen in FIG. 1 there is provided a support foot 12 passing through the bottom wall 6 and fixed to the lower supporting structure 7. The support foot 12 is equipped with a guide device 13 configured to guide movement in translation in the heightwise direction of the loading pipe 10 and the offloading pipe 11 and to keep the loading and offloading pipes 10, 11 vertical and on the axis of the dome structure 8. The support foot 12 is therefore positioned near the axis of the dome structure 8. As represented in FIG. 2 the dome structure 8 and the support foot 12 are respectively situated in an area of the ceiling wall 4 and an area of the bottom wall 6 closer to the rear wall 20 than the front wall, as.

The support foot 12 and the guide device 13 are described in more detail hereinafter.

FIGS. 2 to 5 represent the support foot 12 equipped with a guide device 13 in accordance with different embodiments.

As can be seen in FIG. 3 the support foot 12 has a shape of revolution of circular section extending in the heightwise direction H with a frustoconical lower part 14 that is connected at its end of smallest diameter to a cylindrical upper part 15. The larger diameter base of the frustoconical part 14 is fixed to the lower supporting wall 7 of the supporting structure 3. The frustoconical lower part 14 extends through the thickness of the bottom wall 6 of the tank 71 beyond the level of the primary sealing membrane 2. The cylindrical upper part 15 is closed in sealed manner by means of a circular plate for example. The secondary and primary sealing membranes 2 are connected in sealed manner to the frustoconical lower part 14 by means of a secondary collar 16 and a primary collar 17.

The guide device 13 is welded to the cylindrical upper part 15 of the support foot 12. The guide device 13 includes a support plate 18 that is fixed to the cylindrical upper part 15 by means of two connecting plates 19, as can be seen in FIG. 3 in particular. The connecting plates 19 are for example welded on the one hand to the cylindrical upper part 15 and on the other hand to the support plate 18. The support plate 18 is positioned in a plane orthogonal to the longitudinal direction L while the connecting plates 19 are disposed parallel to one another in planes orthogonal to the heightwise direction H. The connecting plates 19 serve both for fixing the support plate 18 and as stiffeners.

The guide device 13 also includes a first connecting arm 21 and a second connecting arm 22. Each connecting arm 21, 22 includes a base 23, for example in the form of a rectangular plate, that is fixed, for example bolted, to the support plate 18. The base 23 of the first connecting arm 21 and the base 23 of the second connecting arm are disposed at two ends of the support plate 18.

Each connecting arm 21, 22 further includes a connecting tube 24 connected to the base 23 at a first end and extending along an axis parallel to the transverse direction T.

The guide device 13 finally includes a first collar 25 disposed all around the loading pipe 10 and fixed to a second end of the first connecting arm 21 and a second collar 26 disposed all around the offloading pipe 11 and fixed to a second end of the second connecting arm 22. The first collar 25 and the second collar 26 have a central axis that is oriented vertically so as to guide the pipes 10, 11 in movement in translation in the heightwise direction of the tank.

Each collar 25, 26 is formed of a first cylindrical portion 27 welded to the second end of the connecting tube 24. The first cylindrical portion 27 includes attachment zones 28 on either side of the first cylindrical portion 27. Each collar 25, 26 is also formed of a second cylindrical portion 29 including attachment zones 28 on either side of the second cylindrical portion 29 and disposed facing the attachment zones 28 of the first cylindrical portion 27. The first cylindrical portion 27 is removably fixed to the second cylindrical portion 29 by bolting it thereto so as to form a cylindrical collar surrounding one of the pipes 10, 11.

As represented in FIG. 3 in particular the internal surface of the first collar 25 and the internal surface of the second collar 26 are equipped with a plurality of anti-friction pads 30 each extending in the heightwise direction and regularly distributed on the internal surface. The anti-friction pads 30 are configured to serve as contact surfaces limiting friction on the pipes 10, 11. The anti-friction pads are made of a material chosen for example from polytetrafluoroethylene (PTFE) or high-density polyethylene (HDPE).

In order to stiffen the connecting tubes 24 of the connecting arms 21, 22, in particular to resist any bending forces, stiffeners 31, 32 extending in the longitudinal direction of the connecting arms 21, 22 are welded along the connecting tubes 24.

FIG. 3 represents a first embodiment of the guide device 13 while FIGS. 4 and 5 represent a second embodiment that differs in the number and the disposition of the stiffeners 31, 32 on the connecting tubes 24.

In the first embodiment, depicted in FIG. 3, the connecting tube 24 of the first connecting arm 21 includes two primary stiffeners 31 disposed on either side of the connecting tube 24 and two primary stiffeners 31 positioned in a plane orthogonal to the heightwise direction H and passing through the central axis of the connecting tube 24. The primary stiffeners 31 of the first connecting arm 21 have a first end welded against the first collar 25 and a second end opposite the first end welded against the base 23 of the first connecting arm 21 so that the primary stiffeners 31 extend over all the dimension in the longitudinal direction L of the connecting tube 24.

Also in the first embodiment the connecting tube 24 of the second connecting arm 22 includes two secondary stiffeners 32 disposed on either side of the connecting tube 24 and two secondary stiffeners 32 positioned in a plane orthogonal to the heightwise direction H passing through the axis of the connecting tube 24. The secondary stiffeners 32 of the second connecting arm 22 further have a first end welded against the second collar 26 and a second end opposite the first end situated at a distance from the base 23 of the second connecting arm 22 so that the stiffeners 32 extend over a portion of the dimension in the longitudinal direction L of the connecting tube 24.

In the second embodiment depicted in FIGS. 4 and 5 primary stiffeners 31 have been added all around the connecting tube 24 of the first connecting arm 21 compared to the first embodiment. In this embodiment the connecting tube 24 of the first connecting arm 21 is therefore equipped with six primary stiffeners 31 regularly distributed all around the connecting tube 24 and extending from the first collar 26 to the base 23.

In other embodiments that are not represented the number and the arrangement of the stiffeners 31, 32 on the connecting tubes 24 of the connecting arms 21, 22 can vary. In fact, the connecting tubes 24 may be equipped with at least two stiffeners 31, 32, the stiffeners being exclusively primary stiffeners 31 or secondary stiffeners 32 or primary stiffeners 31 alternating with secondary stiffeners 32.

In FIG. 5 the loading pipe 10 and the secondary pipes 33 have been represented with the support foot 12 and the guide device 13. The loading pipe 10 therefore passes the first collar 26 of the guide device 13. Where the secondary pipes 33 are concerned, they are also guided in movement in translation in the heightwise direction H by means of secondary guide devices 34.

The secondary guide device 34 include on the one hand a secondary collar 36 disposed all around one of the secondary pipes 33 and a secondary connecting arm 35 fixed on the one hand to the secondary collar 36 and on the other hand to one of the pipes 10, 11. In the embodiment represented in FIG. 5 the secondary guide devices 35 are fixed to the loading pipe 10 and each secondary guide 33 is guided by a plurality of secondary guide device 35 distributed in the heightwise direction H.

Referring to FIG. 6, a cutaway view of a methane tanker ship 70 shows a sealed and insulated tank 71 of prismatic general shape mounted in the double hull 72 of the ship. The wall of the tank 71 includes a primary sealed barrier intended to be in contact with the LNG contained in the tank, a secondary sealed barrier arranged between the primary sealed barrier and the double hull 72 of the ship, and two insulating barriers respectively arranged between the primary sealed barrier and the secondary sealed barrier and between the secondary sealed barrier and the double hull 72.

In a manner known in itself loading/offloading pipes 73 disposed on the top deck of the ship may be connected by means of appropriate connectors to a maritime or harbor terminal to transfer a cargo of LNG from or to the tank 71.

FIG. 6 shows an example of a maritime terminal including a loading and offloading station 75, an underwater pipe 76 and a terrestrial installation 77. The loading and offloading station 75 is a fixed off-shore installation including a mobile arm 74 and a tower 78 that supports the mobile arm 74. The mobile arm 74 carries a bundle of insulated flexible tubes 79 that can be connected to the loading/offloading pipes 73. The orientable mobile arm 74 adapts to all methane tanker loading gauges. A connecting pipe that is not shown extends inside the tower 78. The loading and offloading station 75 enables loading and offloading of the methane tanker 70 from or to the terrestrial installation 77. The latter includes liquefied gas storage tanks 80 and connecting pipes 81 connected via the underwater pipe 76 to the loading or offloading station 75. The underwater pipe 76 enables transfer of the liquefied gas between the loading or offloading station 75 and the terrestrial installation 77 over a great distance, for example 5 km, which enables the methane tanker ship 70 to remain at a great distance from the coast during loading and offloading operations.

Pumps onboard the ship 70 and/or pumps equipping the terrestrial installation 77 and/or pumps equipping the loading and offloading station 75 are used to generate the pressure necessary to transfer the liquefied gas.

Although the invention has been described in connection with a plurality of particular embodiments, it is obvious that it is in no way limited to them and that it encompasses all technical equivalents and combinations of the means described if the latter fall within the scope of the invention.

The use of the verb “to include” or “to comprise” and conjugate forms thereof does not exclude the presence of elements or steps other than those stated in a claim.

In the claims, any reference sign between parentheses should not be interpreted as a limitation of the claim.

The invention claimed is:

1. A sealed and thermally-insulating tank (71) for storing liquefied gas integrated into a supporting structure (1), the tank (71) including a bottom wall (6) and a ceiling wall (4) opposite the bottom wall (6) in a heightwise direction (H) of the tank (71), the bottom wall (6) and the ceiling wall (4) being fixed to the supporting structure (1), in which the ceiling wall (4) has passed through it at least one first pipe (10) and one second pipe (11), in which the tank (71) is equipped with a support foot (12) passing through the bottom wall (6) and fixed to the supporting structure (1) and a guide device (13) fixed to the support foot (12), the guide device (13) being configured to guide movement in translation in the heightwise direction (H) of the first pipe (10) and of the second pipe (11), wherein the guide device (13) includes a first collar (25) disposed all around the first pipe (10) and configured to guide movement in translation in the heightwise direction (H) of the first pipe (10) during thermal contraction or expansion of the first pipe (10), a second collar (26) disposed all around the second pipe (11) and configured to guide movement in translation of the second pipe (11) in the heightwise direction (H) during thermal contraction or expansion of the second pipe (12), a support plate (18) fixed to the support foot (12), a first connecting arm (21) connecting the first collar (25) to the support plate (18), and a second connecting arm (22) connecting the second collar (26) to the support plate (18).

2. The tank (71) as claimed in claim 1 in which stiffeners are formed along the first connecting arm (21) and/or the second connecting arm (22).

3. The tank (71) as claimed in claim 2 in which the stiffeners are gussets.

4. The tank (71) as claimed in claim 1 in which the first collar (25) includes a first cylindrical portion (27) fixed to the first connecting arm (21) and a second cylindrical portion (29) fixed to said first cylindrical portion (27) of the first collar (25) and in which the second collar (26) includes a first cylindrical portion (27) fixed to the second connecting arm (22) and a second cylindrical portion (29) fixed to said first cylindrical portion (27) of the second collar (26).

5. The tank (71) as claimed in claim 1 in which an internal surface of the first collar (25) and/or an internal surface of the second collar (26) is or are equipped with at least one anti-friction pad (30).

6. The tank (71) as claimed in claim 5 in which the anti-friction pad (30) is made of a material the static coefficient friction of which on steel is less than or equal to 0.2.

7. The tank (71) as claimed in claim 1 in which the first pipe (10) is a liquefied gas loading pipe connected to a loading pump and the second pipe (11) is a liquefied gas offloading pipe connected to an offloading pump.

8. The tank (71) as claimed in claim 1 in which the guide device (13) is a main guide device (13) and in which the ceiling wall (4) has passed through it at least one third pipe (33), the tank (71) being equipped with at least one secondary guide device (34), the secondary guide device (34) being fixed to the first pipe (10) or to the second pipe (11), the secondary guide device (34) being configured to guide movement in translation in the heightwise direction (H) of the third pipe (33), and in which the second guide device (34) includes a third collar (36) disposed all around the third pipe (33), a third connecting arm (35) connecting the third collar (36) to the first pipe (10) or to the second pipe (11).

9. The tank (71) as claimed in claim 1 in which the tank (71) includes in a direction of thickness from the exterior to the interior of the tank (71) at least one thermally-insulating barrier and at least one sealing membrane supported by the thermally-insulating barrier and intended to be in contact with the fluid contained in the tank (71).

10. A ship (70) for the transportation of a cold liquid product, the ship including a double hull (72) and a tank (71) as claimed in claim 1 disposed in the double hull, the ship extending in a longitudinal direction (L).

11. The ship as claimed in claim 10 in which the first connecting arm (21) and the second connecting arm (22) extend orthogonally to the longitudinal direction (L).

12. The ship as claimed in claim 10 in which the first pipe (10) and the second pipe (11) are situated on either side of a transverse plane passing through the support foot (12) that is orthogonal to the longitudinal direction (L), the support plate (18) being positioned in a plane orthogonal to the transverse direction (T), the transverse direction (T) being perpendicular to the longitudinal direction (L).

13. The ship as claimed in claim 10 in which the support plate (18) is fixed to the support foot (12) by means of at least two connecting plates (19), the connecting plates (19) being positioned in a plane orthogonal to the heightwise direction (H), the connecting plates (19) being disposed against the support plate (18) in the longitudinal direction (L) so as to stiffen the support plate (18) against bending.

14. A transfer system for a cold liquid product, the system including a ship (70) as claimed in claim 10, insulated pipes (73, 79, 76, 81) arranged in such a manner as to connect the tank (71) installed in the hull of the ship to a floating or terrestrial storage installation (77) and a pump for driving a flow of cold liquid product through the insulated pipes from or to the floating or terrestrial storage installation to or from the tank (71) of the ship.

15. A method of loading or offloading a ship (70) as claimed in claim 10 in which a cold liquid product is routed through insulating pipes (73, 79, 76, 81) from or to a floating or terrestrial storage installation (77) to or from the tank (71) of the ship.

* * * * *